(12) United States Patent
James et al.

(10) Patent No.: US 7,905,016 B2
(45) Date of Patent: Mar. 15, 2011

(54) SYSTEM FOR FORMING A GAS COOLED AIRFOIL FOR USE IN A TURBINE ENGINE

(75) Inventors: Allister W. James, Orlando, FL (US); Douglas J. Arrell, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1008 days.

(21) Appl. No.: 11/784,986

(22) Filed: Apr. 10, 2007

(65) Prior Publication Data

US 2008/0250641 A1 Oct. 16, 2008

(51) Int. Cl.
*B23P 15/02* (2006.01)
(52) U.S. Cl. ...................... 29/889.7; 29/889.71
(58) Field of Classification Search ............... 29/889.7, 29/889.71
See application file for complete search history.

(56) References Cited

U.S. PATENT DOCUMENTS

| | | | | |
|---|---|---|---|---|
| 2,686,654 A * | 8/1954 | Roush | | 428/551 |
| 3,494,709 A | 2/1970 | Piearcey | | |
| 4,327,154 A * | 4/1982 | Rossmann | | 428/545 |
| 4,440,834 A * | 4/1984 | Aubert et al. | | 428/554 |
| 4,576,874 A * | 3/1986 | Spengler et al. | | 428/623 |
| 5,489,194 A | 2/1996 | Yoshinari et al. | | |
| 5,571,345 A | 11/1996 | Ganesh et al. | | |
| 5,634,189 A * | 5/1997 | Rossmann et al. | | 428/547 |
| 5,702,288 A | 12/1997 | Liebke et al. | | |
| 5,724,643 A | 3/1998 | Ewing | | |
| 5,774,779 A | 6/1998 | Tuchinskiy | | |
| 6,060,174 A | 5/2000 | Sabol et al. | | |
| 6,231,692 B1 | 5/2001 | Vogt et al. | | |
| 6,254,998 B1 | 7/2001 | Tuchinsky | | |
| 6,428,280 B1 * | 8/2002 | Austin et al. | | 416/241 B |
| 6,435,824 B1 * | 8/2002 | Schell et al. | | 415/174.4 |
| 6,443,700 B1 * | 9/2002 | Grylls et al. | | 416/229 R |
| 6,630,423 B2 | 10/2003 | Alvin et al. | | |
| 6,648,596 B1 | 11/2003 | Grylls et al. | | |
| 6,709,771 B2 * | 3/2004 | Allister | | 428/680 |
| 6,863,868 B1 | 3/2005 | Alvin | | |
| 6,974,508 B1 | 12/2005 | Gabb et al. | | |
| 7,144,220 B2 * | 12/2006 | Marcin, Jr. | | 416/97 A |
| 7,594,325 B2 * | 9/2009 | Read | | 29/889.71 |
| 2003/0185685 A1 * | 10/2003 | Simon | | 416/229 R |
| 2006/0263231 A1 | 11/2006 | Groh et al. | | |
| 2007/0122606 A1 * | 5/2007 | Meier et al. | | 428/304.4 |
| 2007/0274854 A1 * | 11/2007 | Kelly et al. | | 419/2 |
| 2008/0118355 A1 * | 5/2008 | Buttner et al. | | 416/95 |

FOREIGN PATENT DOCUMENTS

JP   55114452 A   *   9/1980
JP   63014802 A       1/1988

* cited by examiner

Primary Examiner — David P Bryant
Assistant Examiner — Jacob J Cigna

(57) ABSTRACT

A turbine airfoil system for forming a turbine airfoil that is usable in a turbine engine. The airfoil may be formed from a porous material shaped into an outer airfoil shape. The porous material may include an inner central spar capable of supporting the turbine airfoil an outer porous region and an outer coating. The porous material facilitates efficient cooling of the turbine airfoil.

20 Claims, 3 Drawing Sheets

SYSTEM FOR FORMING A GAS COOLED AIRFOIL FOR USE IN A TURBINE ENGINE

FIELD OF THE INVENTION

This invention is directed generally to turbine engines, and more particularly to manufacturing methods for turbine airfoils usable in turbine engines.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 ,degrees Fahrenheit. Typical turbine combustor configurations expose turbine vane and blade assemblies to these high temperatures. As a result, turbine vanes and blades must be made of materials capable of withstanding such high temperatures. In addition, turbine vanes and blades often contain cooling systems for prolonging the life of the vanes and blades and reducing the likelihood of failure as a result of excessive temperatures. Nonetheless, conventional turbine airfoils often are damaged prematurely due to thermal stresses. Thus, a need exists for a turbine airfoil having increased capacity to withstand the high temperature environment of turbine engines.

SUMMARY OF THE INVENTION

This invention relates to a turbine airfoil system for forming a turbine airfoil that is usable in a turbine engine. The airfoil may be formed from a porous material shaped into an outer airfoil shape. The porous material may include an inner central spar capable of supporting the turbine airfoil, an outer porous region, and an outer coating. The turbine airfoil may be usable as a stationary turbine vane or rotatable turbine blade. The turbine airfoil may include a leading edge, a trailing edge, a pressure side outer surface, and a suction side outer surface.

The method of forming a turbine airfoil usable in a turbine engine may include forming a porous material into a shape of an airfoil including leading and trailing edges and pressure and suction sides and include infiltrating an outer portion of the porous material with a stopper material, whereby a central, inner aspect of the porous material remains unfilled. The method may also include infiltrating the central, inner aspect of the porous material with a metal powder and consolidating the metal powder. The method may further include applying an outer coating to an outer surface of the airfoil and removing the stopper material from the porous structure, thereby forming the airfoil shape with a central spar, a region of porous material surrounding the central spar and an outer coating.

Forming the porous material into a shape of an airfoil including leading and trailing edges and pressure and suction sides may include forming a porous material formed from a metal foam. The metal foam may be formed from a nickel base superalloy, FeCrAlY or other appropriate material capable of withstanding high temperatures and having good oxidation resistance. The step of infiltrating the porous material with a stopper material may include infiltrating the porous material with a wax, a ceramic filler or other appropriate material. The step of infiltrating the central, inner aspect of the porous material with a metal powder may include infiltrating the central, inner aspect of the porous material with a metal powder mixed with a binder material. The metal power may be consolidated by subjecting the metal powder to vibration, heat treatment or HIPing (hot isostatic pressing), or combinations thereof. Applying the outer coating to an outer surface of the airfoil may include applying the outer coating via spray deposition or via powder metallurgy, such as via infiltration of metallic powder and application of a heat treatment or HIPing to the powder.

An advantage of this invention is that the outer coating and the region of porous material surrounding the central spar provides superior heat resistance.

Another advantage of this invention is that the invention includes an airfoil with an efficient cooling scheme such as a porous region remaining between the central inner core and the airfoil skin providing a path for the cooling air with excellent heat transfer capability.

Still another advantage of this invention is that the invention includes an efficiently cooled airfoil with high structural integrity, in particular, the foam preform extends throughout the airfoil and in not just bonded onto the surface of a central spar. Thus, the porous cooling channels may be an integral part of the airfoil and is not subject to de-bonding.

Another advantage of this invention is that the outer coating can be applied to mechanically interlock with the porous structure and not just bond to the outer surface, thereby increasing the strength of the connection.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
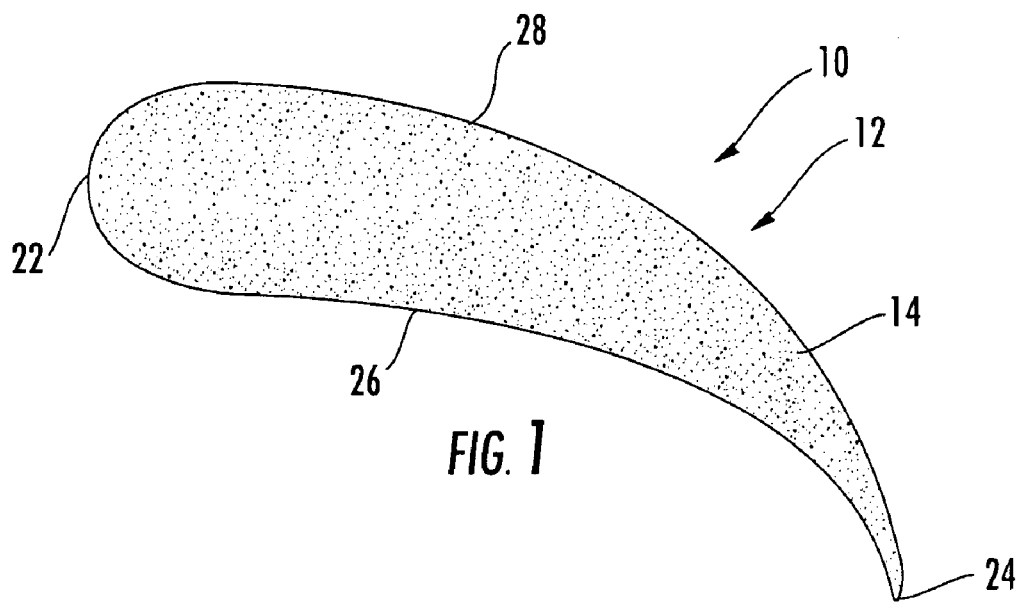
FIG. 1 is a cross-sectional view of a partially formed airfoil for a turbine engine in which the airfoil is shown in the first step of a method of forming the airfoil of this invention, whereby the airfoil is formed from a porous material.

As shown in FIGS. 1-5, this invention is directed to a turbine airfoil system 10 for forming a turbine airfoil 12 that is usable in a turbine engine. The airfoil 12 may be formed from a porous material 14 shaped into an outer airfoil shape. At the conclusion of the method, the porous material 14 may include an inner central spar 16 capable of supporting the turbine airfoil 12, an outer porous region 18, and an outer coating 20. The turbine airfoil 12 may be usable as a stationary turbine vane or rotatable turbine blade. The turbine airfoil 12 may include a leading edge 22, a trailing edge 24, a pressure side outer surface 26, and a suction side outer surface 28.

Figure 2:
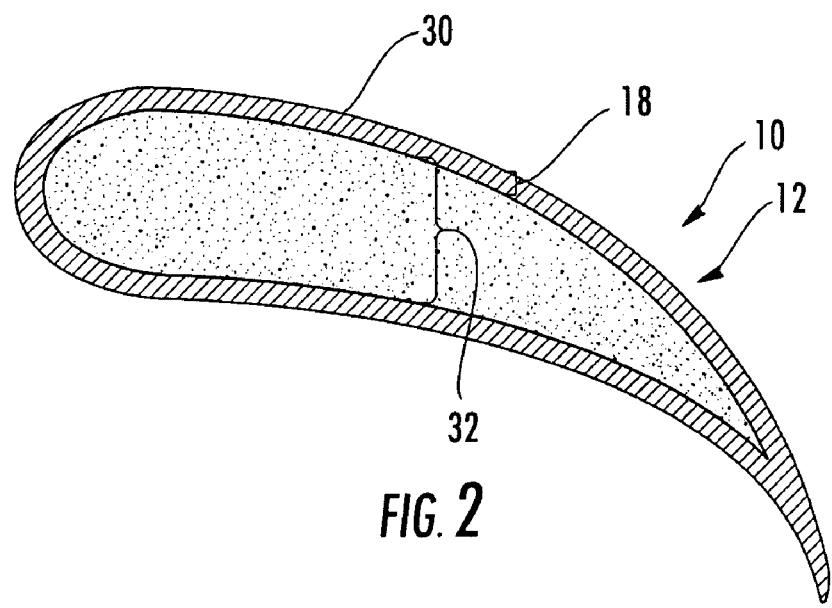
FIG. 2 is a cross-sectional view of a partially formed airfoil for a turbine engine in which the airfoil is shown in the second step of a method of forming the airfoil of this invention, whereby the airfoil is formed from a porous material and an outer portion of the airfoil is infiltrated with a stopper material.

As shown in FIG. 1, the turbine airfoil 12 may be formed from a porous material 14. The porous material 14 may be shaped into an airfoil shape. The porous material 14 may be formed from materials including, but not limited to, a metal foam. The metal foam may be formed from materials that are capable of withstanding high temperatures and have good oxidation resistant properties such as, but not limited to, a nickel base superalloy and FeCrAlY. As shown in FIG. 2, an outer portion 18 of the metal foam 14 may be infiltrated with a stopper material 30. The stopper material 30 may infiltrate only a portion of the metal foam 14 whereby a central, inner aspect 32 of the porous material 14 remains unfilled and in later stages becomes the central spar 16. The stopper material 30 may be, but is not limited to being, a wax or a ceramic slurry.

Figure 3:
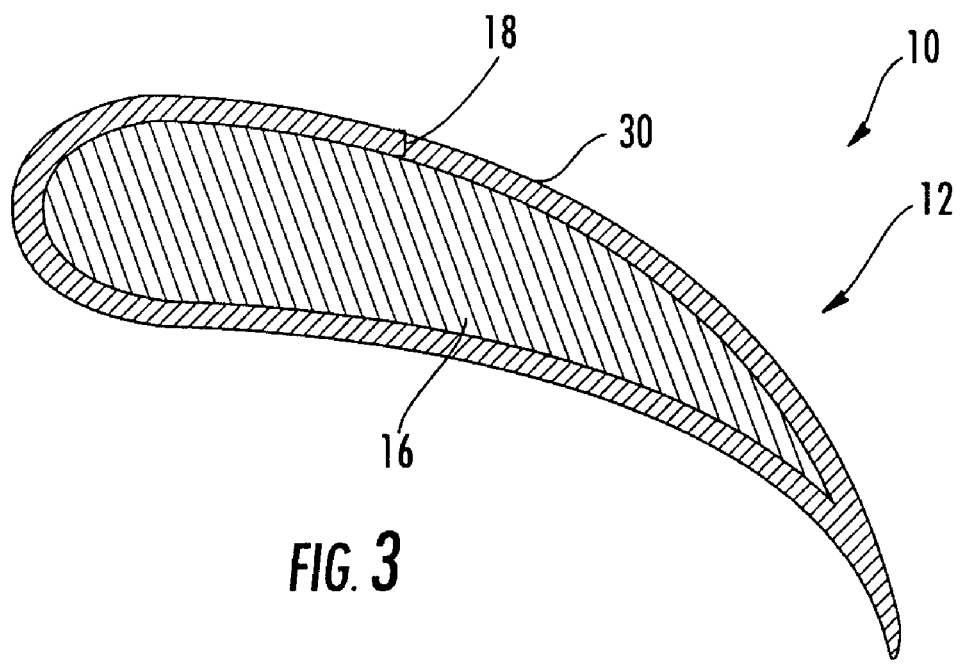
FIG. 3 is a cross-sectional view of a partially formed airfoil for a turbine engine in which the airfoil is shown in the third step of a method of forming the airfoil of this invention, whereby the airfoil is formed from a porous material, an outer portion of the airfoil is infiltrated with a stopper material and a central, inner aspect of the airfoil is infiltrated with a metal powder and consolidated.
Figure 4:
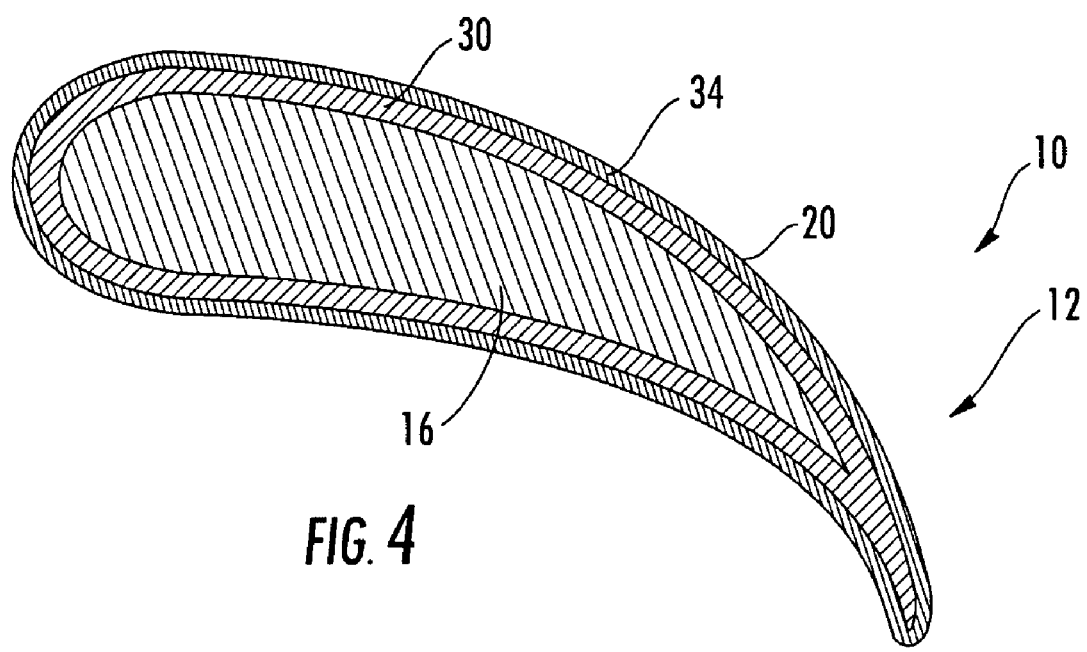
FIG. 4 is a cross-sectional view of a partially formed airfoil for a turbine engine in which the airfoil is shown in the fourth step of a method of forming the airfoil of this invention, whereby the airfoil is formed from a porous material, an outer portion of the airfoil is infiltrated with a stopper material, a central, inner aspect of the airfoil is infiltrated with a metal powder and consolidated, and an outer coating is applied.

As shown in FIG. 3, the central, inner aspect 32 of the porous material 14 may be infiltrated with a metal powder. The metal powder may be, but is not limited to, nickel based superalloys such as CM247,LC, U720,Li, IN738 ,or any other high temperature capable alloy, including Fe and Co base alloys, such as X-45,, ECY-768 and IN706,. The metal powder may or may not be mixed with a binder. The powder may be consolidated through methods such as, but not limited to, vibration, heat treatment or HIPing (hot isostatic pressing), or both. HIPing is a process for closing internal porosity of cast components and for consolidating articles manufactured from metal powders. The HIPing process can achieve nearly 100 ,percent density. As shown in FIG. 4, an outer coating 20 may be applied to an outer surface 34 of the airfoil 12. The outer coating 20 may be applied in any appropriate manner. For instance, the outer coating may be applied via spray deposition or powder metallurgy, such as application of heat treatment or HIPing, or both. The HIPing may be performed at elevated temperatures, such as typically above 1000 ,degrees C. for nickel base superalloys. Actual HIP conditions depend on the alloy composition. The HIP cycles typically last for three to five hours and are performed at high pressure, such as about 100 ,MPa. Subsequent heat treatments could include a solution or homogenization heat treatment followed by aging heat treatments to optimize the microstructure/properties.

Figure 5:
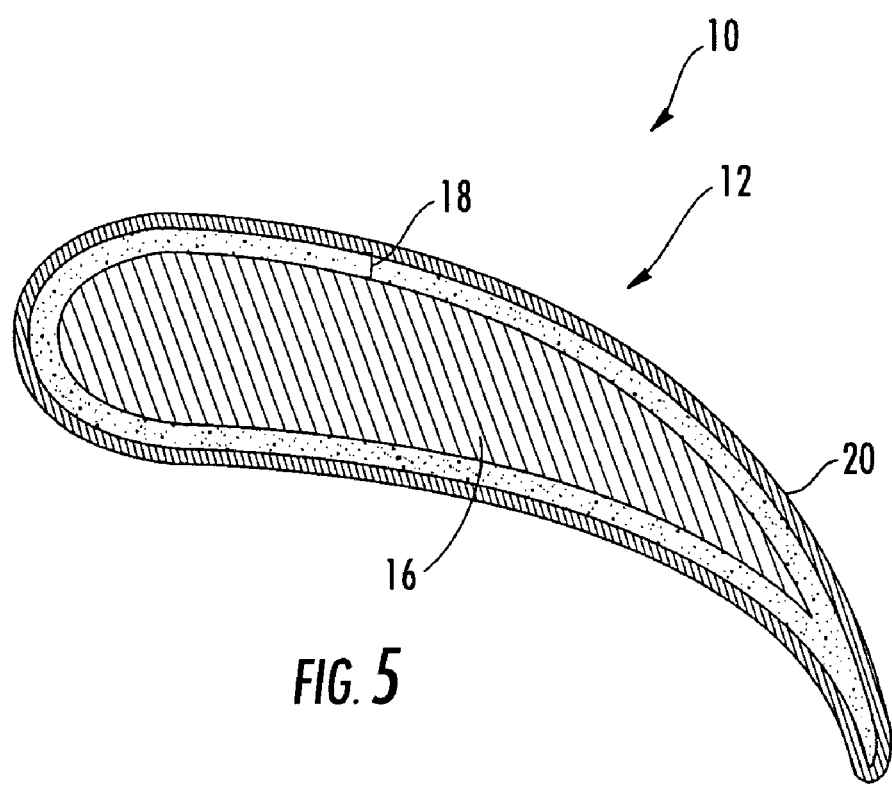
FIG. 5 is a cross-sectional view of a partially formed airfoil for a turbine engine in which the airfoil is shown in the fifth step of a method of forming the airfoil of this invention, whereby the airfoil is formed from a porous material, an outer portion of the airfoil is infiltrated with a stopper material, a central, inner aspect of the airfoil is infiltrated with a metal powder and consolidated, an outer coating is applied, and the stopper material is removed.

As shown in FIG. 5, the stopper material 30 may be removed from the outer porous region 18 of the porous structure 14, thereby forming the airfoil shape with a central spar 16, a region of porous material 18 surrounding the central spar 16 and an outer coating 20. The stopper material 30 may be removed via leaching.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method of forming a turbine airfoil usable in a turbine engine, comprising:
   forming a porous material into a shape of an airfoil including leading and trailing edges and pressure and suction sides;
   infiltrating an outer portion of the porous material with a stopper material, whereby a central, inner aspect of the porous material remains unfilled;
   infiltrating the central, inner aspect of the porous material with a metal powder;
   consolidating the metal powder;
   applying an outer coating to an outer surface of the airfoil; and
   removing the stopper material from the porous structure, thereby forming the airfoil shape with a central spar, a region of porous material surrounding the central spar and an outer coating.

2. The method of claim 1, wherein forming a porous material into a shape of an airfoil including leading and trailing edges and pressure and suction sides comprises forming a porous material formed from a metal foam.

3. The method of claim 1, wherein infiltrating the porous material with a stopper material comprises infiltrating the porous material with a wax.

4. The method of claim 1, wherein infiltrating the porous material with a stopper material comprises infiltrating the porous material with a ceramic filler.

5. The method of claim 1, wherein infiltrating the central, inner aspect of the porous material with a metal powder comprises infiltrating the central, inner aspect of the porous material with a metal powder mixed with a binder material.

6. The method of claim 1, wherein consolidating the metal powder comprises subjecting the metal powder to vibration.

7. The method of claim 1, wherein consolidating the metal powder comprises subjecting the metal powder to heat treatment.

8. The method of claim 1, wherein applying an outer coating to an outer surface of the airfoil comprises applying the outer coating via spray deposition.

9. The method of claim 1, wherein applying an outer coating to an outer surface of the airfoil comprises applying the outer coating via powder metallurgy.

10. The method of claim 1, wherein applying the outer coating to the outer surface of the airfoil comprises applying the surface layer via infiltration of metallic powder.

11. The method of claim 2, wherein forming a porous material into a shape of an airfoil including leading and trailing edges and pressure and suction sides comprises using the metal foam formed from a nickel base superalloy.

12. The method of claim 2, wherein forming a porous material into a shape of an airfoil including leading and trailing edges and pressure and suction sides comprises using the metal foam formed from FeCrAlY.

13. The method of claim 7, wherein consolidating the metal powder comprises subjecting the metal powder to HIPing.

14. The method of claim 10, further comprising applying a heat treatment to the powder.

15. The method of claim 14, further comprising applying HIPing to the powder.

16. A method of forming a turbine airfoil usable in a turbine engine, comprising:
   forming a porous material of a metal foam, formed from materials selected from a group consisting of a nickel base superalloy and FeCrAlY, into a shape of an airfoil including leading and trailing edges and pressure and suction sides;

infiltrating an outer portion of the porous material with a stopper material, whereby a central, inner aspect of the porous material remains unfilled;

infiltrating the central, inner aspect of the porous material with a metal powder;

consolidating the metal powder;

applying an outer coating to an outer surface of the airfoil; and removing the stopper material from the porous structure, thereby forming the airfoil shape with a central spar, a region of porous material surrounding the central spar and an outer coating.

17. The method of claim 16, wherein infiltrating the porous material with a stopper material comprises infiltrating the porous material with a material selected from the group consisting of a wax and a ceramic filler.

18. The method of claim 16, wherein infiltrating the central, inner aspect of the porous material with a metal powder comprises infiltrating the central, inner aspect of the porous material with a metal powder mixed with a binder material.

19. The method of claim 16, wherein consolidating the metal powder comprises subjecting the metal powder to a method selected from a group consisting of vibration, heat treatment, and HIPing.

20. The method of claim 16, wherein applying an outer coating to an outer surface of the airfoil comprises applying the outer coating via a method selected from a group consisting of spray deposition and powder metallurgy via infiltration of metallic powder and application of a heat treatment to the powder.

* * * * *